United States Patent
Christensen

(10) Patent No.: US 9,459,458 B2
(45) Date of Patent: Oct. 4, 2016

(54) TRANSPARENT SOUND DAMPENING PROJECTION SCREEN

(71) Applicant: 360Brandvision, Inc., Las Vegas, NV (US)

(72) Inventor: Olav Christensen, Brooklyn, NY (US)

(73) Assignee: 360Brandvision, Inc., Las Vegas, NV (US)

(*) Notice: Subject to any disclaimer, the term of this patent is extended or adjusted under 35 U.S.C. 154(b) by 97 days.

(21) Appl. No.: 14/379,658

(22) PCT Filed: Feb. 21, 2013

(86) PCT No.: PCT/US2013/027007
§ 371 (c)(1),
(2) Date: Aug. 19, 2014

(87) PCT Pub. No.: WO2013/126493
PCT Pub. Date: Aug. 29, 2013

(65) Prior Publication Data
US 2015/0055024 A1 Feb. 26, 2015

Related U.S. Application Data
(60) Provisional application No. 61/601,198, filed on Feb. 21, 2012.

(51) Int. Cl.
| | |
|---|---|
| G03B 21/56 | (2006.01) |
| G02B 27/01 | (2006.01) |
| H04N 13/04 | (2006.01) |
| G03B 21/60 | (2014.01) |
| G03B 21/62 | (2014.01) |
| H04N 5/60 | (2006.01) |
| H04N 9/31 | (2006.01) |
| H04N 21/41 | (2011.01) |
| H04N 21/414 | (2011.01) |
| H04N 21/431 | (2011.01) |

(52) U.S. Cl.
CPC ........... *G02B 27/0172* (2013.01); *G03B 21/56* (2013.01); *G03B 21/60* (2013.01); *G03B 21/62* (2013.01); *H04N 5/60* (2013.01); *H04N 9/31* (2013.01); *H04N 13/0459* (2013.01); *G02B 2027/0174* (2013.01); *G02B 2027/0178* (2013.01); *H04N 21/4122* (2013.01); *H04N 21/41422* (2013.01); *H04N 21/431* (2013.01)

(58) Field of Classification Search
CPC ..................... H04N 13/0459; H04N 13/0495; H04N 13/0488; G03B 21/56; G02F 1/167
See application file for complete search history.

(56) References Cited

U.S. PATENT DOCUMENTS

| | | | |
|---|---|---|---|
| 3,961,839 A | 6/1976 | Brobst | |
| 5,573,325 A | 11/1996 | Lekowski | |
| 5,865,519 A | 2/1999 | Maass | |
| 6,369,943 B1 | 4/2002 | Bachmann et al. | |
| 6,943,774 B2 * | 9/2005 | Horiki | G06F 1/1616 178/18.09 |
| 7,184,209 B2 | 2/2007 | Simonsen et al. | |
| 8,328,361 B2 | 12/2012 | O'Connell et al. | |

(Continued)

*Primary Examiner* — Sultan Chowdhury
(74) *Attorney, Agent, or Firm* — Mark S. Leonardo; Brown Rudnick LLP

(57) ABSTRACT

The invention generally provides a transparent projection screen material with sound dampening properties and methods for using a screen to manipulate light and sound. Methods and materials of the invention can improve live sound and sound recordings by inhibiting ambient sound from reaching listeners or microphones and reducing feedback.

13 Claims, 10 Drawing Sheets

(56) References Cited

U.S. PATENT DOCUMENTS

| | | | |
|---|---|---|---|
| 2002/0186465 A1* | 12/2002 | DeSanto | G02B 6/08 359/460 |
| 2003/0117583 A1 | 6/2003 | Werhahn-Wunderlich | |
| 2006/0109548 A1 | 5/2006 | Goto | |
| 2007/0047065 A1* | 3/2007 | Toyoda | G02F 1/167 359/296 |
| 2008/0084542 A1* | 4/2008 | Lalley | G03B 21/56 353/10 |
| 2010/0253918 A1* | 10/2010 | Seder | G01S 13/723 353/13 |
| 2010/0302643 A1* | 12/2010 | Larreta | G02B 27/08 359/616 |
| 2011/0037952 A1 | 2/2011 | LaDuke et al. | |
| 2012/0098941 A1* | 4/2012 | Joseph | G02B 27/221 348/51 |
| 2012/0154753 A1 | 6/2012 | O'Connell et al. | |
| 2012/0314284 A1 | 12/2012 | Howes et al. | |

* cited by examiner

TRANSPARENT SOUND DAMPENING PROJECTION SCREEN

CROSS-REFERENCE TO RELATED APPLICATION

This application claims priority to U.S. Provisional Application Ser. No. 61/601,198, filed Feb. 21, 2012, the contents of which are incorporated by reference.

FIELD OF THE INVENTION

The invention generally relates to systems and methods for presenting audio-visual spectacles using transparent sound dampening projection screens.

BACKGROUND

Communication with an audience typically requires the presentation of sound or images. Public spaces for communication often have poor acoustic qualities. Ambient noise or resonant properties of construction materials and dimensions in, for example, concert halls, open air venues, small rooms, and retail spaces can make the presentation of desirable sound quality difficult. The presentation of visual images is typically done by displaying of signs or video, for example, by putting a TV monitor in a public space. The control of sound is typically done by "brute force" methods such as, for example, avoiding feedback in PA systems by simply turning the volume down.

SUMMARY

The invention provides integrated audio/visual display materials enabling 3D holographic compositing of live spectacles with displayed images and videos and sound manipulation properties. Methods and materials of the invention offer visual displays with concealed sound sources and highly tunable sound dampening properties. Materials of the invention can be used to impede the transmission of sound waves from a speaker to a connected microphone, thereby breaking a feedback loop and preventing undesirable and painful feedback. Further, due to transparency and functional invisibility, material of the invention can be provided as screens across sound sensitive areas that do not interfere with visual perception in those areas. Further, materials of the invention operate as projection screens. Thus, material of the invention can reveal a spectacle disposed behind it while simultaneously displaying an image projected onto it, both with great clarity and visibility, while also baffling and dampening intrusive or unwanted sound, improving the properties and qualities of sound recording and playback, for example, by cutting an amount of ambient noise that reaches a microphone or listener, and breaking a feedback cycle.

In certain aspects, the invention provides an audiovisual display system that includes a substantially flat screen with a translucent mesh defining an obverse surface and a reverse surface; a projector configured to project an image onto the obverse surface; and a speaker configured to transmit a sound wave towards the reverse surface. A computer device is included and operably coupled to the speaker and the projector. Additionally, the system may include a microphone. The mesh of the screen provides sound-dampening benefits. Accordingly, the speaker can face the reverse side of the screen. The microphone can face the obverse side, and the screen diminishes amplitude of sound from the speaker, thus preventing a feedback loop. Also, the mesh material is both translucent and also useable as a projection screen. This allows images to projected onto the screen, while other material is disposed behind the screen. Installations comprising this arrangement have been found to be particularly attention-grabbing and very effective communication tools.

In certain embodiments, the mesh is made up of synthetic fibers. The fibers may have a cross-sectional geometry that is substantially uniform along a length, such as a triangular cross-sectional shape. The synthetic fibers may have a maximum cross-sectional dimension of about 100 microns, e.g., about 20 microns. The synthetic fibers can be spaced away from one another by a minimum spacing distance that is about 50 microns, preferably about 100 microns. In some embodiments, the minimum spacing distance is about 450 microns. The synthetic fibers can be arranged in at least a warp set and a woof set, wherein fibers within each set are substantially parallel to one another. In some embodiments, some of the synthetic fibers (e.g., the warp) are substantially perpendicular to others of the synthetic fibers (e.g., the woof). In a preferred embodiment, at least the obverse surface is gray.

In related aspects, the invention provides a method of presenting an audiovisual display that includes processing, with a computer comprising a memory coupled to a processor, a digital file to generate an audio signal defining a sound and an image signal defining an image and using a projector to project the image onto an obverse surface of a substantially flat screen comprising a translucent mesh defining the obverse surface and a reverse surface while also playing, using a speaker to transmit a sound wave towards the reverse surface, the sound. An object (such as a sign, statue, poster, etc.) may be disposed behind the screen such that the reverse surface faces the object and the method can include using a light fixture to illuminate the object, to make the object visible to a person looking at the obverse surface.

In some embodiments, at least a part of the digital file is obtained through the use of a microphone while the microphone is disposed so that the obverse surface faces the microphone, and the method further can include diminishing the sound using the mesh to avoid a feedback loop between the microphone and the speaker. In certain embodiments, the mesh comprises synthetic fibers having a substantially triangular cross-section, a maximum cross-sectional dimension of about 100 microns, or both.

DETAILED DESCRIPTION

Figure 1:
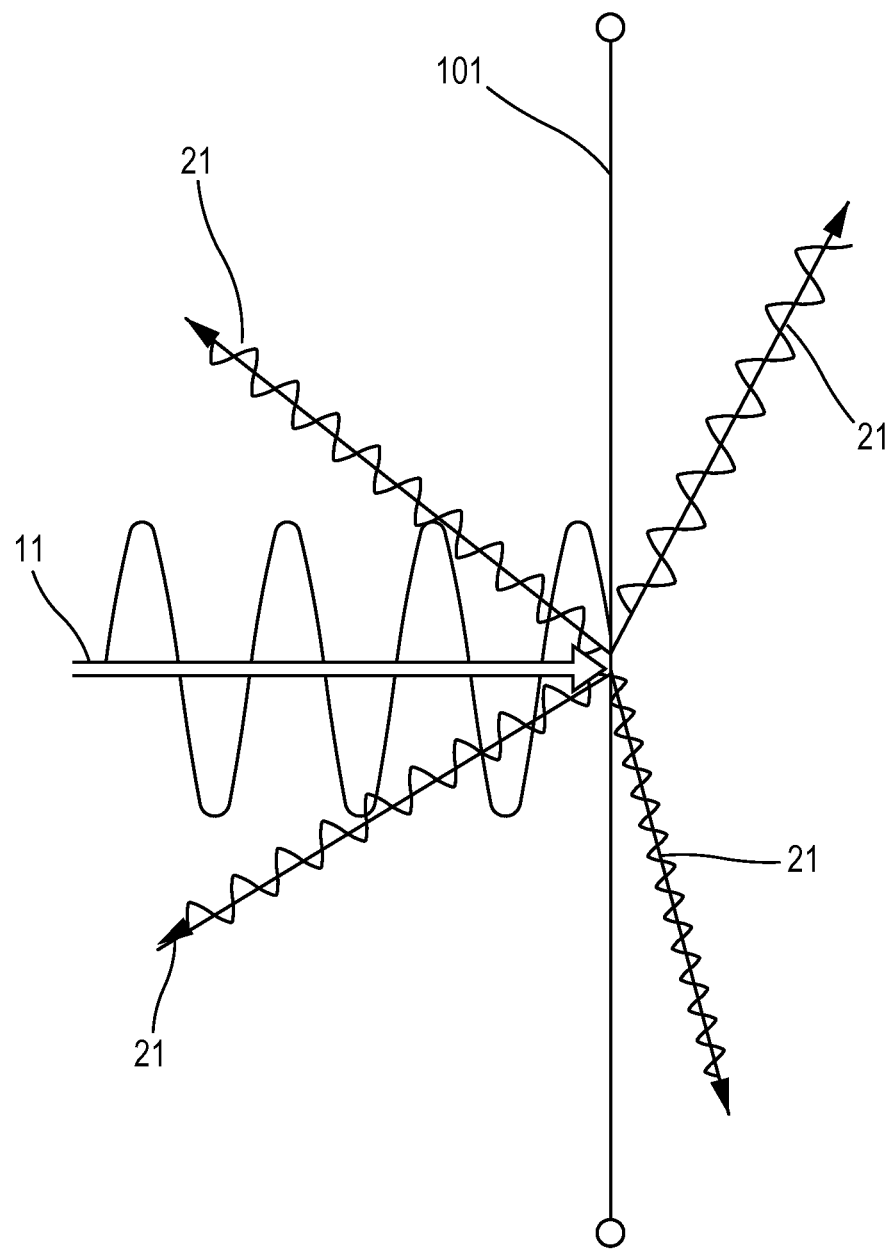
FIG. 1 shows interaction of a sound wave with a screen material of the invention.

The invention generally provides a transparent projection screen material with sound dampening properties and methods for using a screen to manipulate light and sound. In general, screen material of the invention includes fabric-like material formed by a network of fine strands. In certain embodiments, the strands are a synthetic material, for example, acrylic fibers. Fibers according to the invention preferably have roughly a geometric cross-section, with either a precise or irregular geometry. In a preferred embodiment, fibers have a triangular cross-section.

Material strands will generally have a diameter between about 5 and 100 microns, preferably between about 10 to about 20 microns, averaged along a length of the fiber. Generally, fibers will be formed into networks comprising a warp set of parallel fibers and a woof set of parallel fibers such that an angle is formed between the warp set and the woof set. Within a set, the fibers are generally substantially parallel to each other, and between about 50 and about 5,000 microns apart. Preferably, the parallel fibers are between about 100 and about 1,000 microns apart, for example, all approximately about 500 microns apart (e.g., between about 450 and about 550 microns apart). The angle between sets generally will be above about 40 degrees and in certain embodiments, greater than about 60 degrees. In a preferred embodiment, the fibers are substantially perpendicular to each other. Such a network of fibers offers a fine mesh to function as a transparent projection screen material A fine mesh screen material can be made by weaving the fibers together, fusing them, adhering them, or synthesizing the material in substantially grid-like pattern (e.g., polymerizing acrylonitrile into a screen-like form, or molding material into the form). Generally, the screen material is neutral grey or uncolored. In some embodiments, the material is treated to confer a matt charcoal gray finish.

The screen material can be provided or stored in rolls, for example, as rectangles of material about 50 yards by about 15 yards, or about 1 yard by about 39 yards, or any other convenient measurement.

The screen material can be placed as flats. A flat, generally, is a panel of the screen material. A flat can include a portion of the screen material stretched around a frame. Screen material can be fixed to the frame of a flat by adhesive or sewing or fusing (e.g., back onto itself or onto a fusible material in the frame). A frame can be closed loop of material such as metal, plastic, or wood. Screen material can also be fixed to a straight "bar" of material and stretched to another bar, parallel to the first one. A flat can also be formed by hanging screen material from a fastening point, for example, from hooks or from an adhesive strip. Generally, a flat will have a two dimensional, substantially flat, substantially planar surface. However, in certain embodiments discussed in greater detail below, a flat can have other surface morphologies.

A flat comprising screen material of the invention exhibits the useful property of being transparent while operating as a projection screen. That is, an image can be projected onto the screen material and be visible. Also, a spectacle on one side of the screen is visible to a person or camera on the far side of the screen. More significantly, the screen material is substantially invisible to the naked eye when it is not purposefully made visible (e.g., by projecting an image onto it).

Furthermore, the translucent properties of the screen material allow for multiple layers of projection or objects behind the screens or flats, enhancing depth perception. Projecting onto multiple layers can create visual depth of great richness. Any number of screens can be positioned (e.g., substantially parallel and spaced apart), each with visual material projected thereon to create three-dimensional visuals having apparent depth.

Screen material of the invention is both transparent and functional as a projection screen. An item can be positioned behind the screen and illuminated (i.e., directly, or exposed to any amount of light such as ambient light or dim light) and the can be made to appear as if the screen material were not present. Also, images can be projected onto the material. Projecting images is discussed in U.S. Pat. Nos. 8,328,361; 7,184,209; 5,865,519; U.S. Pub. 2012/0314284; U.S. Pub. 2012/0154753; and U.S. Pub. 2011/0037952, the contents of which are hereby incorporated by reference in their entirety.

Materials of the invention can also be used to present three dimensional visual displays. Exemplary 3D displays are discussed in U.S. Pub. 2003/0117583, the contents of which are hereby incorporated by reference in their entirety.

The screen material further operates to substantially disrupt the transmission of sound and exhibits salutary acoustic properties when used or disposed according to the disclosures of this invention. Without being bound by any theory or mechanism of action, FIG. 1 illustrates a sound wave 11 impinging on a surface of a flat 101 of the screen material. While sound wave 11 is generally illustrated with a transverse wave line, this is for convenience of illustration only and the illustrated effect is exhibited on longitudinal waves such as sound waves as transmitted through the air. Flat 101 can be any dimension, and is shown in FIG. 1 as a straight black line with circles on the ends. These circles are for ease of recognition among the various figures discussed herein, and flat 101 need not have any particular structure at its edges.

As shown in FIG. 1, incoming sound wave 11 impinges on flat 101. Sound wave 11 is unable to progress wholly intact through flat 101. Instead, flat 101 breaks up sound wave 11 and causes its energy to be dissipated as an incoherent array of minor waves 21. Where sound wave 11 may have been clearly audible to a human listener, minor waves 21 generally will not be.

Figure 2:
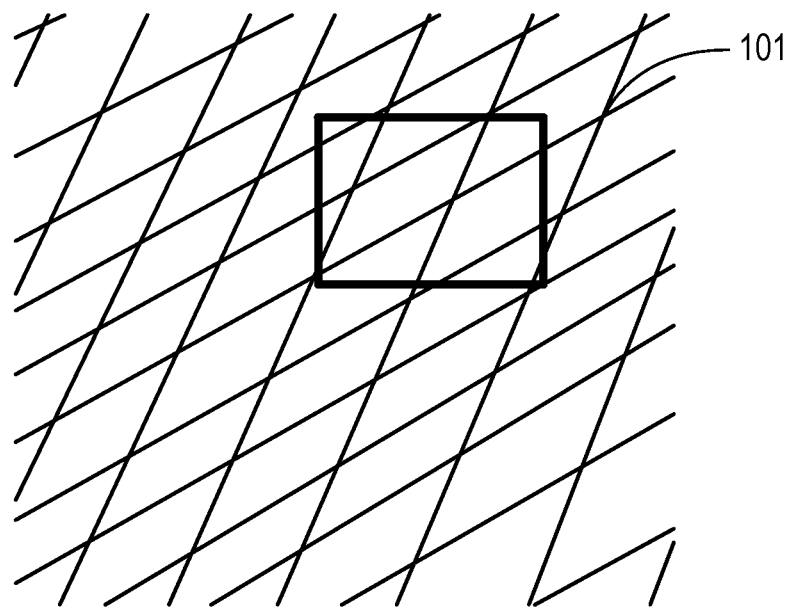
FIG. 2 shows a detail view of screen material of the invention.
Figure 3:
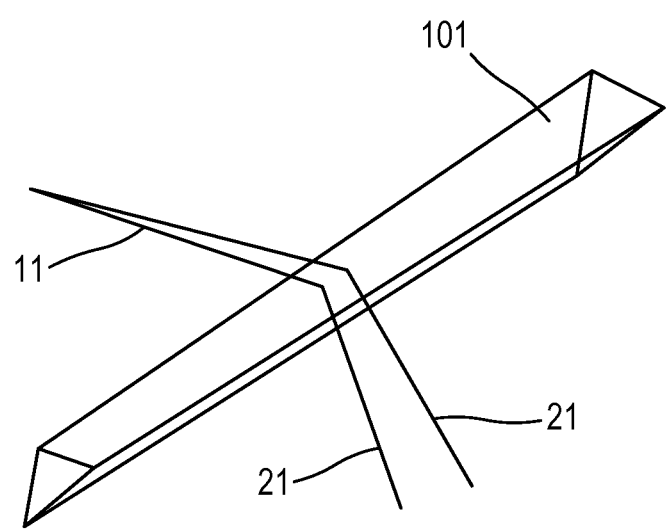
FIG. 3 shows interaction of a sound wave with a fiber of screen material of the invention.

FIG. 2 is an angled close-up view of screen material of the invention. A rectangle is drawn for scale, encompassing an area of approximately 1,000 microns$^2$ on the screen material. FIG. 3 shows a strand have a triangular cross-section breaking incoming wave 11 into minor waves 21.

Figure 4:
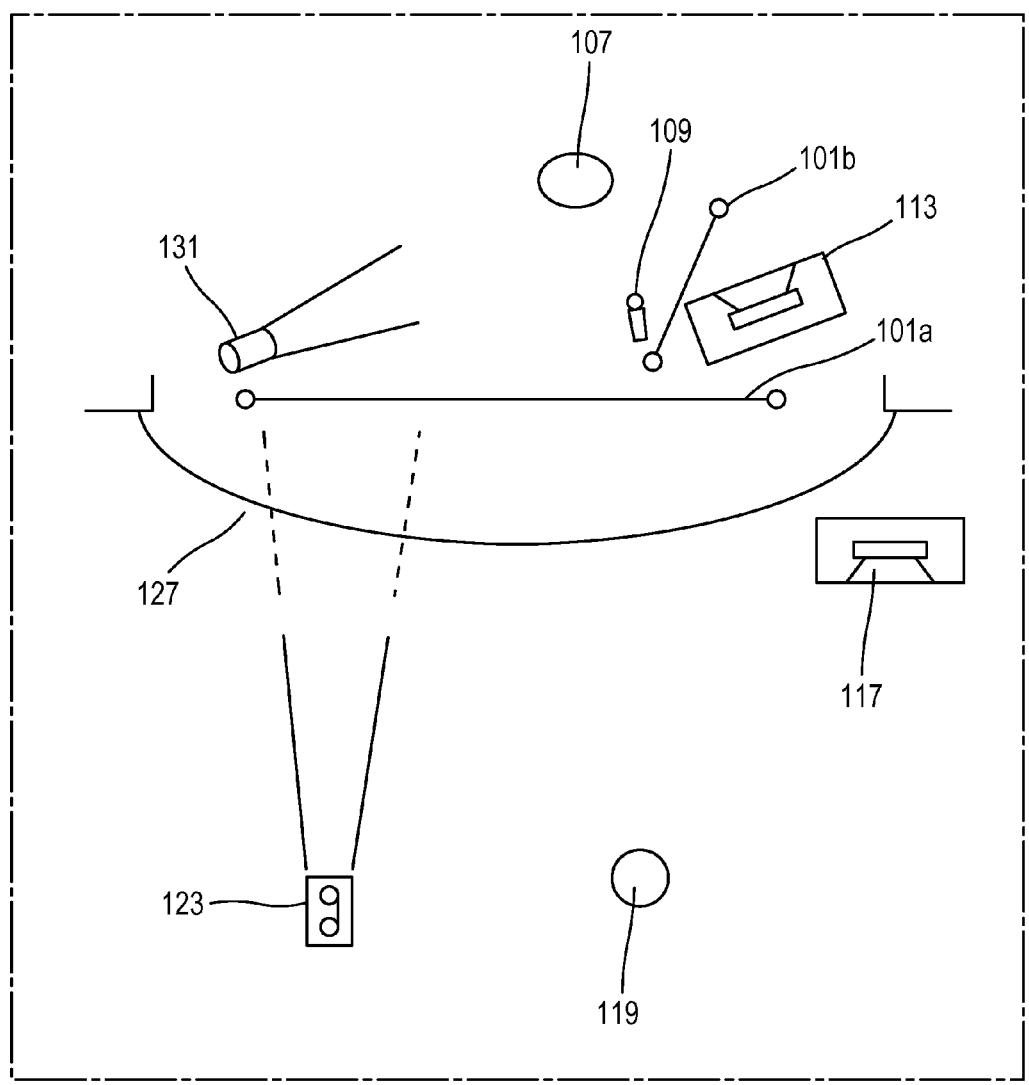
FIG. 4 shows sound and sight tuning on a stage by materials and methods of the invention.

FIG. 4 shows a flat being used in a staged performance in an audio visual display according to certain embodiments. As shown in FIG. 4, performer 107 is on stage 127. Flat 101a defines a substantially flat screen on stage 127 with an obverse surface facing the house and a reverse surface facing performer 107. Performer 107 and any objects (e.g., clothing or props) in this vicinity of performer 107 are visible from the house. A second person 119 (who could be an audience member) is shown out in the house (i.e., audience area). Microphone 109 is placed to capture sound from performer 107. Speaker 113 is placed to operate as a monitor for performer 107, while speaker 117 is placed to address second person 119. Light source 131 illuminates performer 107. Projector 123 projects an image onto the obverse surface of flat 101a. Further use of screen in performance is discussed in U.S. Pat. No. 5,573,325, the contents of which is hereby incorporated by reference in its entirety. Speaker 113 and projector 123 can be operably connect to, and controlled by, a computer. Microphone 109 could be connected to the computer, either directly or via a sound board or PA system.

When flats 101a and 101b are used as shown in FIG. 4, second person 119 can see both performer 107 and the image projected by projector 123 due to the unique light handling properties of the screen material. Further, flat 101b cuts the intensity of sound transmitted from speaker 113 to microphone 109. While FIG. 4 presents a simplified view, flat 101b can have any useful shape or disposition. Flat 101b can be a small circle of screen material near microphone 109, a large rectangle of screen material near speaker 113, or both.

When used as shown in FIG. 4, flat 101a dampens the sounds from the audience area (e.g., from second person 119) that reaches performer 107 and microphone 109. This aids microphone 109 in capturing a clear sound from performer 107, and aid performer 107 in hearing a clear sounds from monitor speaker 113.

Any place where a microphone may be used to capture one source of sound (a performer) preferentially over another source of sound (audience noise), screen material of the invention may be used to dampen unwanted sound and keep it from bleeding back to the microphone. Further, any arrangement wherein a speaker is playing sound being captured by a microphone, feedback can be inhibited by placing screen material of the invention between them.

Furthermore, due to the fact that an image can be projected onto flat 101a by projector 123, monitor 113 or other stage equipment can be concealed from second person 119.

Figure 5:
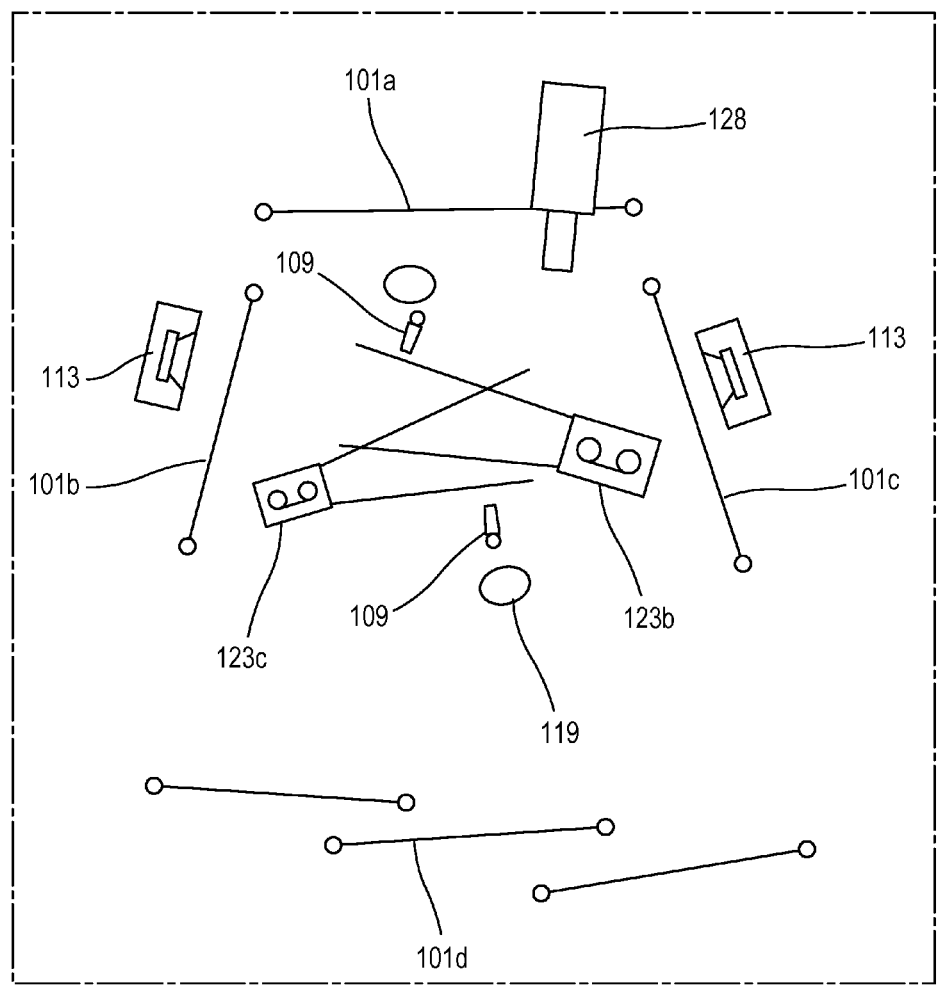
FIG. 5 shows sound and sight tuning at a trade show booth with methods and materials of the invention.

FIG. 5 shows another method of using one or more of flat 101, here in the context of a trade show booth area, to provide an audiovisual display system. As shown in FIG. 5, performer 107 (here, a salesperson or company representative) stands among displays. Displays are shown that include one or more of projector 123 facing an obverse side of flat 101 (e.g., projector 123b faces an obverse side of flat 101b and projector 123c faces flat 101c) so that the flats are showing media designed for the trade show. In the embodiment shown in FIG. 5, each of the displays has a speaker 113 concealed behind it facing a reverse side of the flat, with the result that audio can be synced to video on the "screens" provided by flats 101b and 101c.

FIG. 5 also shows a camera 128, here pointed at a second person 119 (who is also interrogated with a microphone 109). Thus, this trade show booth can display "audience reactions" on flat 101b by using a microphone 109 and a camera 128 to capture sound and video of second person 119. The sound and video can be played through speaker 113 and projector 123, for example, simultaneously with the participation of second person 109 or later. Thus, other attendees of a trade show can have their attention drawn to the activities in this trade show booth. Further, FIG. 5 shows a flat 101a along the back of the trade show booth area and three of flat 101d overlapping each other and disposed forward of the trade show booth area. These flats can disrupt and deaden ambient sound. Where a trade show is conducted in a noisy convention hall, for example, placing flats 101 around an area can create a local enclave of relative quiet, allowing for more sensitive acoustic operations.

Further, in any embodiment of the invention, a speaker may be integrally mounted with a screen material of the invention. For example, a speaker cabinet may form a support for screen material, or screen material can provide a cover for a speaker. Speakers with screens are discussed in U.S. Pat. No. 5,982,537, the contents of which are hereby incorporated by reference in their entirety.

Figure 6:
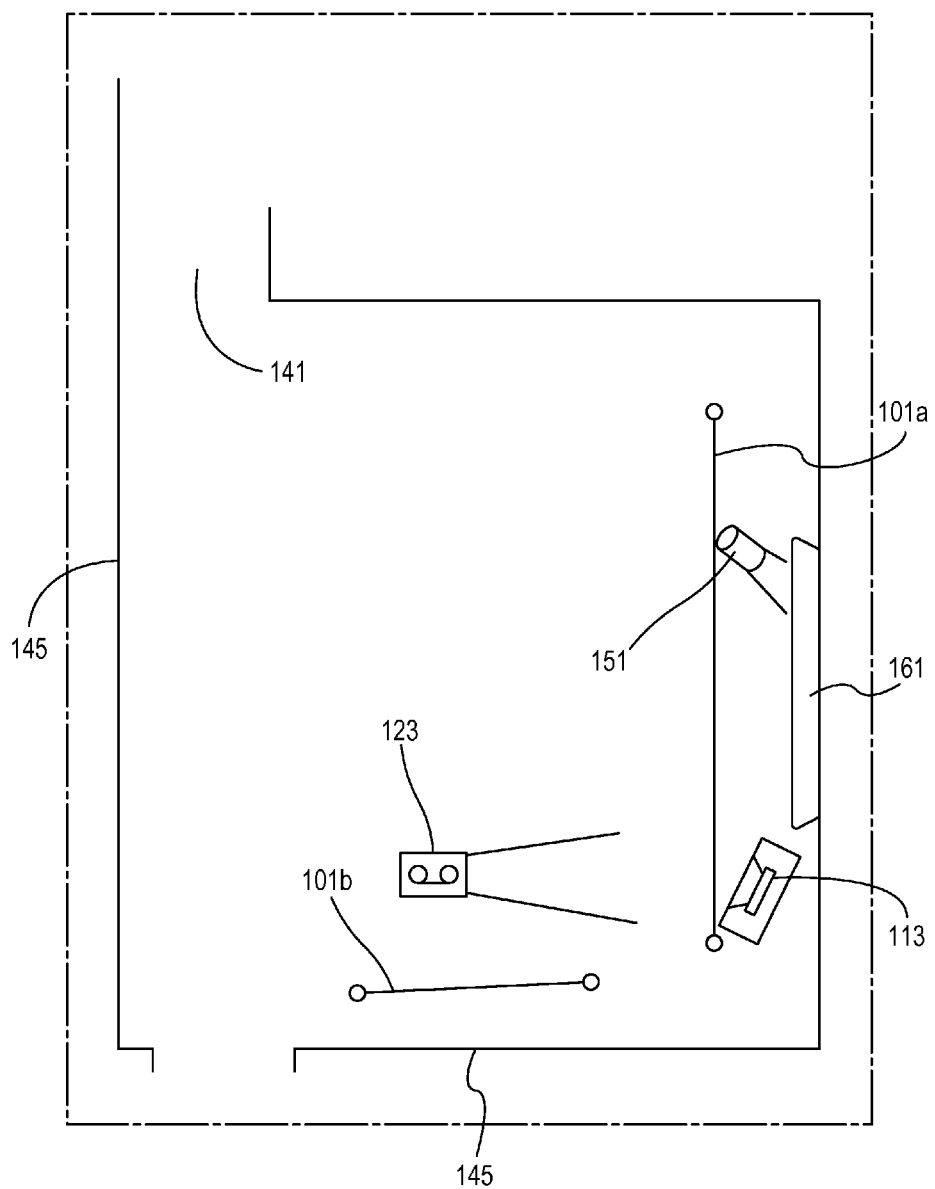
FIG. 6 shows sound and sight tuning in a gallery according to the invention.

FIG. 6 shows an audiovisual display in a museum gallery benefiting from an acoustic treatment provided by the invention. As shown in FIG. 6, an object (painting 161) is hung on a wall and illuminated by light source 151. Wall 145 presents a smooth, hard surface. It is common in museums for such a wall to be marble. Hall 141 has a smooth hard floor and connects to an outer corridor with heavy foot traffic. In an arrangement like this, human activity in area 141 can be a source of excessive and intrusive noise to a person viewing painting 161. Here, flat 101b substantially directly dampens sound coming from area 141 and flat 101a further substantially dampens acoustic reflections off of the smooth hard walls. Painting 161 is disposed proximal to a reverse surface of flat 101a. Flats 101a and 101b are each shown disposed parallel to, and approximately a foot away from, a wall. It is an insight of the invention that this arrangement provides good sound dampening qualities in acoustically significant frequency ranges. This beneficial dampening affect can be heightened by adding a second, third, or Nth flat 101 parallel to, and spaced away from, the wall and either of flat 101a or flat 101b.

Further, methods and materials of the invention offer creative audiovisual displays. As shown in the museum gallery in FIG. 6, flat 101a operates as a screen to display an image or video projected by projector 123. Speaker 113 is configured to transmit sound waves towards a reverse surface of flat 101a to play audio. Due to the arrangement of light source 151, flat 101a, speaker 113, and projector 123, a person in the gallery would: see painting 161; see images and video projected by projector 123; hear audio from speaker 113; not see speaker 113; and not hear ambient noise emanating from area 141.

Figure 7:
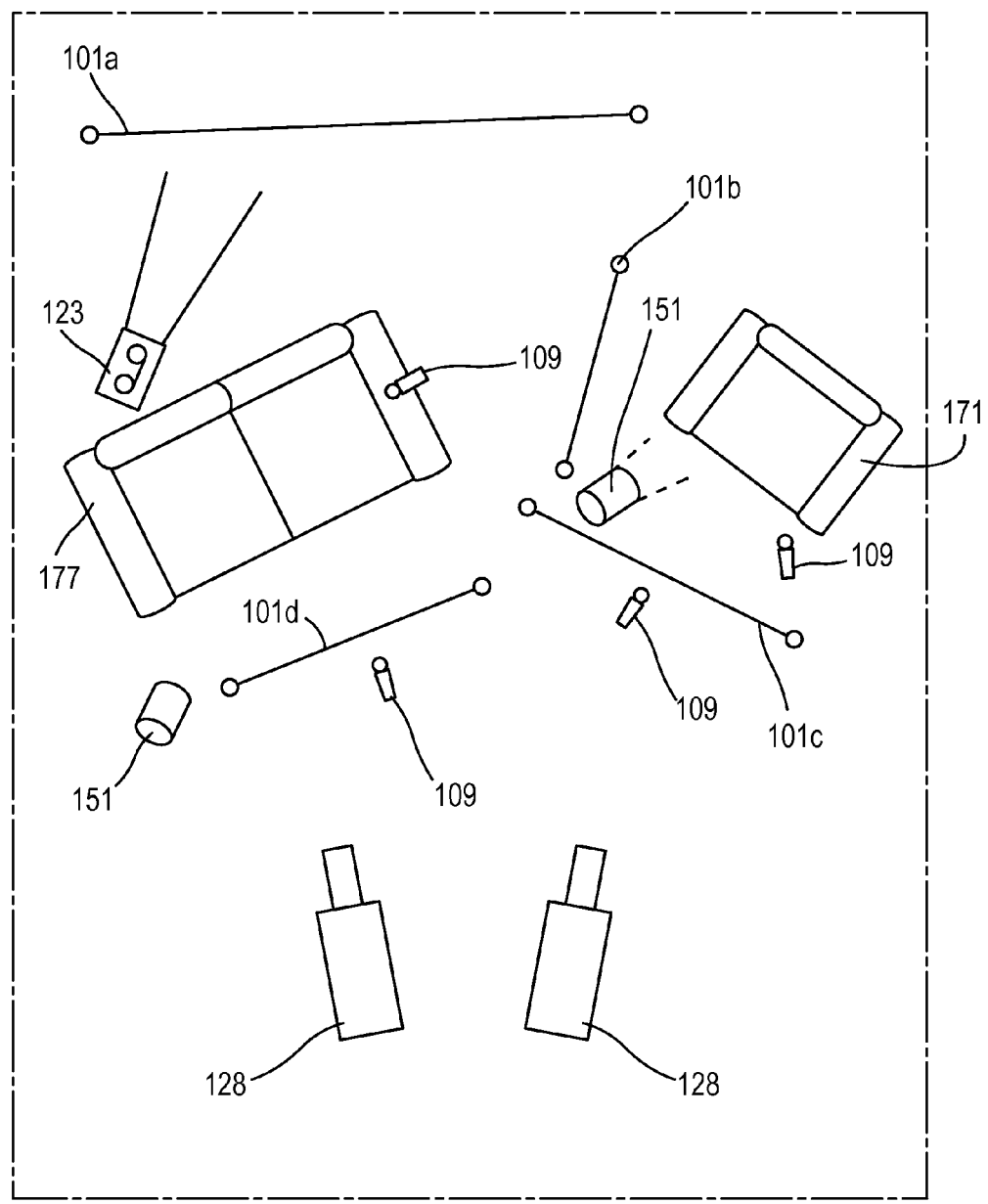
FIG. 7 shows sound and sight tuning in a studio.

FIG. 7 shows a TV studio layout using materials and methods of the invention. As shown in FIG. 7, chair 171 is covered by microphone 109 and light source 151, while being surrounded by flats 101b and 101c. Couch 177 is also proximal to a microphone and a light source. Flat 101a provides a cyclorama behind couch 177. Cameras 123 are trained on the furniture. Further, chair 171 is recorded by two of microphone 109—one separated from chair 171 by a flat 101, and one not so separated.

Screen material of the invention is particularly useful for dampening sound in the mid-high to treble ranges. For example, when recording human speech with a microphone, any sound generally describable as a hiss, whistling, or tweeting can be dampened. Here, in the studio arrangement depicted in FIG. 7, a TV producer can use the arrangement to produce a talk show. A person can sit in chair 171 and talk and be recorded by microphone 109b. If the person has sibilant esses, a producer can cut power to microphone 109b and power on microphone 109d. Then, flat 101d will dampen the person's speech, particularly cutting out sibilance.

Further as shown in FIG. 7, light sources 151 illuminate people on the furniture. No light source is projected onto flats 101c and 101d. Projector 123 projects images or videos onto the cyclorama provided by flat 101a. Thus, cameras 128 see people on the furniture and see anything projected onto flat 101a, while not picking up flats 101c and 101d. Flats 101c and 101d dampen any sound emanating from the pit or audience area, thereby improving sound quality recorded on the stage.

Figure 8:
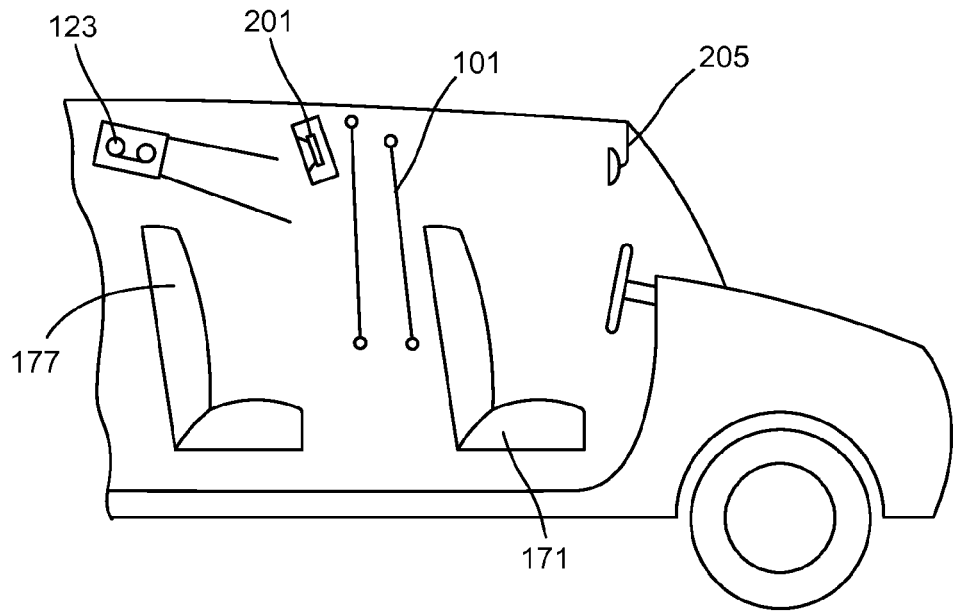
FIG. 8 shows sound and sight tuning in a vehicle by materials and methods of the invention.

FIG. 8 shows materials and methods of the invention employed to allow a back-seat passenger in an automobile to view a video while acoustically isolating a driver. In particular, due to the light manipulating qualities of the screen material of the invention, minor 205 offers a driver a view out the back of the vehicle despite the presence of flats 101. Projector 123 can project a video onto flat 101 and speaker 201 can play sound to a back-seat passenger. Flats 101 can dampen any sound that would otherwise be transmitted to the front of the vehicle, providing for a safer driving experience.

Figure 9:
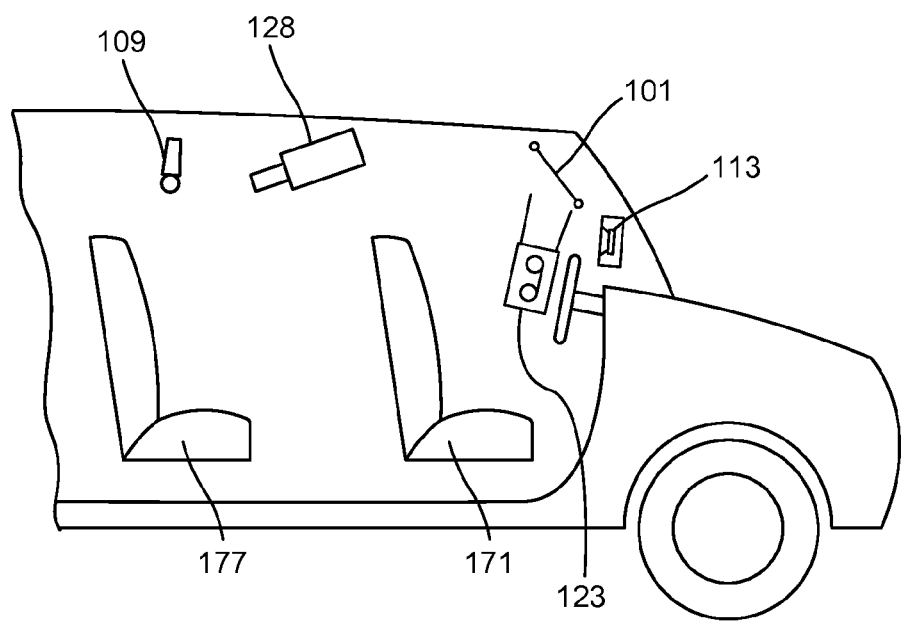
FIG. 9 shows a backseat monitor and audio-enabled HUD according to the invention.

FIG. 9 shows materials and methods of the invention employed to create a back-seat monitor (e.g., for babies) and a heads-up display (HUD) for a driver. As shown in FIG. 9, camera 128 is trained on a back seat passenger, as is microphone 109. Projector 123 projects video (optionally from the back seat camera, optionally from a car's computer or any other source) onto flat 101. Speaker 113 plays sound (optionally from microphone 109). By disposing one or more of flat 101 around a driver or passenger, that person can be acoustically isolated so that distraction is minimized. For example, speaker 113 can be directed at the front seat passenger, and acoustically segregated from the driver.

In any circumstance in which screen material of the invention will be used to display projected material (e.g., a HUD instrument panel), material projected by projector 123 can be digitally processed to be projected with a distortion (e.g., shear, keystone distortion, or other) that complements a disposition of the screen material with the result that, from the perspective of a viewer, projected material appears undistorted. In certain embodiments, the invention provides a computer including a processor and a memory operably coupled to a projector.

Any suitable computer and connected hardware can be used for any embodiment disclosed herein. Any computer can be used, such as a laptop or desktop PC, a portable device such as a smartphone, or another computing device (such as a tablet). Generally, a computer device will include a processor coupled to a memory with one or more input and output mechanisms. Additionally, a computer may communicate with a server via a network. A processor may include any data processing device such as a silicon microchip such as the one sold under the trademark CORE 17 by Intel (Santa Clara, Calif.). A memory may generally include a tangible, non-transitory storage medium, such as a solid-state drive (SSD), flash drive, hard drive, USB drive, or similar. Input and output mechanisms can include one or more of a keyboard, pointer (e.g., mouse, trackpad), monitor, touchscreen, network device (e.g., Wi-Fi card, network-interface card), data connection (e.g., USB port), speaker, microphone, button, or a combination thereof. A server may itself include one or any number of computer device generally including a processor operably coupled to a memory such as, for example, a rack-mounted server such as the one sold under the trademark BLADE by Hitachi Data Systems (Santa Clara, Calif.) or other computer devices.

Other hardware that can be operably connected to a computer includes one or more of projector 123, a microphone 109, a speaker 113, a monitor, or a combination thereof.

Any suitable projector can be used. In some embodiments, a projector with an output between about 600 ANSI lumen and about 12000 ANSI lumens is used. In some embodiments, the output is within the range from 2000 ANSI lumens to 4500 ANSI lumens. In certain embodiments, projector 123 is the SP-H03 projector sold under the trademark PICO by Samsung (Samsung Town, Seoul, South Korea). Projector 123 can be provided by the RLM-W8 8,000 lumen WUXGA DLP projector sold by Barco, Inc. (Duluth, Ga.). In some embodiments, projector 123 is configured with a lens that provides an 0.8:1 throw ratio, meaning that the distance between the projector and the screen (the throw distance) can be about 0.8× the width of source surface.

Microphones suitable for use as microphone 109 include the stage-floor microphone sold under the name Bartlett TM-125C by Bartlett Microphones LLC (Weaverville, N.C.); the wireless transmitter microphone sold under the name SKM 5200 by Sennheiser Electronic Corporation (Old Lyme, Conn.); or the vocal microphone sold under the name SM58 by Shure Incorporated (Niles, Ill.). Any suitable speaker can be used for speaker 113 such as a PA speaker or a home or commercial audio speaker.

Figure 10:
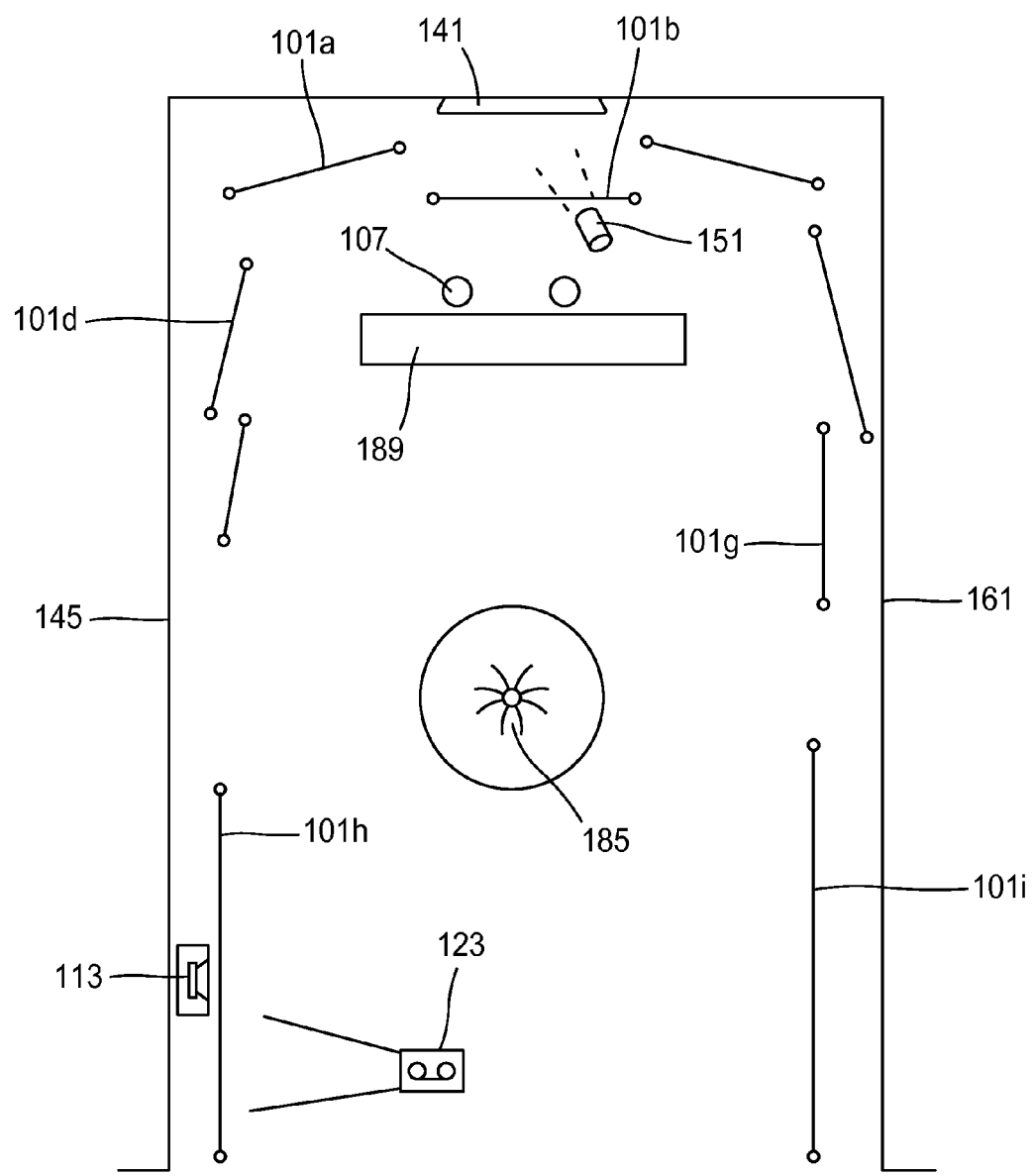
FIG. 10 shows a sound/sight manipulating installation in a noisy lobby.

FIG. 10 shows use of materials and methods of the invention to optimize an acoustic environment as it relates to the architectural qualities of a space. FIG. 10 represents a building lobby (e.g., hotel, bank, other) having smooth hard floors and walls. Such a large, wide open lobby with marble or granite floors and walls can be acoustically resonant creating excessive echo of every transient sound. As shown in FIG. 10, a concierge's desk 189 is staffed by person 107. Fountain 185 operates in the center of the lobby. Person 107 working for a shift may have difficulties hearing customers intercom pages due to foot traffic throughout the lobby and (for example) fountain 185 without the benefit of materials and methods of the invention.

A number of flats 101a-101i have been disposed around the lobby, dampening the transmission and resonance of ambient sound, thereby enabling person 107 to hear their regular business. Further, flats 101 are not visible unless made so, and thus do not interfere with the overall appearance of the lobby. As shown in FIG. 10, a corporate logo sign 141 is placed on the back wall and illuminated by light 151 (suspended above flat 101b, so that light passes directly from light 151 to sign 141 without hitting a surface of flat 101b). Thus, sign 141 is made to be visible to people in the lobby. Also shown in FIG. 10 is projector 123, preferably mounted in a discrete place such as on the ceiling. Flat 101h operates as a display screen for projector 123. Speaker 113 is concealed behind flat 101h by virtue of the fact that an image is projected onto the flat. Thus, a person in the lobby can see the images or videos projected by projector 123, not see speaker 113, hear speaker 113, and hear a very diminished amount of ambient sound.

The invention further provides for the use of screen material indoors or outdoors (e.g., including in certain architectural situations in which an indoor/outdoor boundary may not be completely clear). Material of the invention can be used to provide a business's outdoor sign or informational display. Use of material outdoors is discussed in U.S. Pat. No. 3,961,839, the content of which is hereby incorporated by reference in its entirety.

Figure 11:
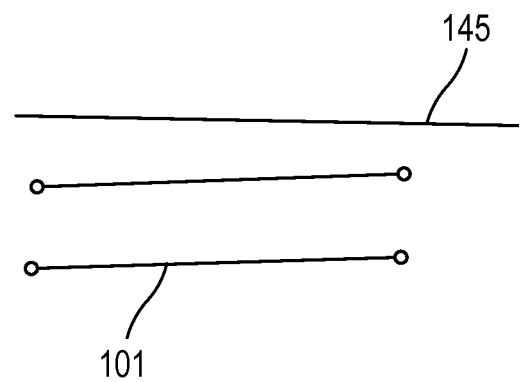
FIG. 11 shows an arrangement of material according to the invention.

As discussed above, one insight of the invention is that placing a flat 101 spaced away from a smooth hard surface and approximately parallel to it yields good sound dampening qualities. A flat may be spaced away from a wall by any distance, for example between about a fraction of an inch and about three feet or more. Preferably, a flat is between a few inches and about 18 inches from a wall, for example, about a foot away. The beneficial acoustic effect of a flat can be magnified (i.e., more sound dampened) by using more than one flat. FIG. 11 shows the use of two of flat 101 disposed about parallel to each other and spaced away from wall 145.

Figure 12:
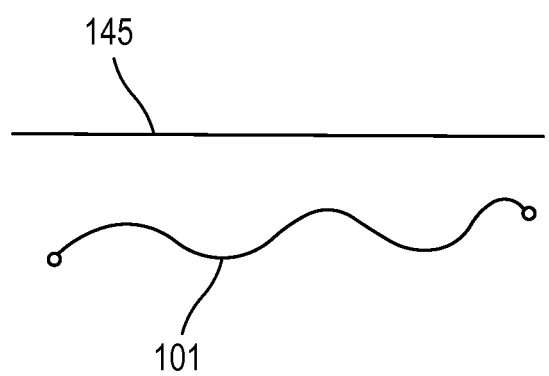
FIG. 12 shows an arrangement of material according to the invention.
Figure 13:
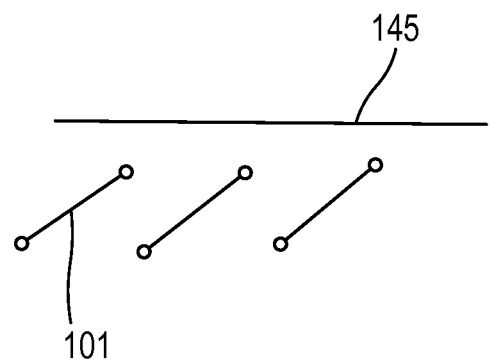
FIG. 13 shows an arrangement of material according to the invention.

The operative surface of flat 101 need not be smooth, planar, or flat to obtain the beneficial properties disclosed herein. FIG. 12 shows flat 101 having a wavy surface and spaced away from wall 145. Further, materials and methods of the invention offer assemblages of flats optimized to deaden sound. FIG. 13 shows a series of three small flats 101 near wall 145. An arrangement as shown in FIG. 13 can be particularly beneficial where a source of sound to be dampened is predominately from a certain direction.

Figure 14:
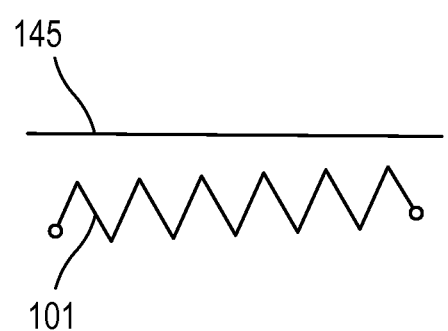
FIG. 14 shows an arrangement of material according to the invention.

Other shapes may offer advantages. FIG. 14 shows flat 101 having a zigzag shape. In some embodiments, flat 101 has an irregularly shaped surface. As shown herein, flat 101 generally has a taught surface and that may be preferred where used as a projection screen for good fidelity reproduction of video. However, sound may be manipulated or dampened using flat 101 with a loose screen, such as by hanging screen material, for example, loosely, or draping screen material over a structure. Further, screen material may be disposed in a non-flat, non-planar, or non-taught structure for video reproductive effects. Video or images may be projected onto curtain-like, loose, or crumpled screen material for interesting or innovative effects. Sound with screens is discussed in more detail in U.S. Pat. No. 6,369,943 and U.S. Pub. 2006/0109548, the contents of each of which are hereby incorporated by reference in their entirety.

Methods of the invention include coordinating the manipulation of audio and video effects including making sound or video more or less perceivable (hiding and showing). For example, video can be projected synced to sound and ambient sounds can be, captured, recorded, or dampened and suppressed. Objects, people, and backgrounds can be hidden behind screen material with light projected onto it or revealed by illumination. Screen material can be made effectively invisible by not illuminating it, or it can be used as a projection screen. Further, images projected onto the screen can be made to appear as objects in space (e.g., by projecting light through a gobo, flag, or cookie, or by projecting light through a film or from a digital file with "dark" space). Further sound levels for recording or playback can be automatically detected or set. Ambient amounts of light and sound can be detected, and methods of the invention can operate based on the detection of sound or light. For example, in certain embodiments, an advertising video is projected onto a screen responsive to new sounds (e.g., footfalls) being detected. In some embodiments, a microphone captures sound and a computer processor synthesizes sound for playback through a speaker, for example, to complement the captured sound or to constructively interfere with it. These and all other described and inherent functions of the invention can be coordinated through one or more computer devices provided by the invention. For example, where projectors are referred to, a projector can be an LCD projector connected to a computer (e.g., a laptop, desktop, tablet, or kiosk computer with a unique form factor). Devices for capturing or producing light and sound can be triggered, operated, or coordinated by any device including computers or smartphones. For example, a projector can be provided that can connect to a smart phone or other computer device and project images or video therefrom. Thus, for example, a concert attendee or a trade show attendee can send images or videos from their device to a device of a system of the invention, e.g., to have it projected on a screen or to have audio played on a speaker. These and other operations and any devices of the invention can be connected and coordinated by a network, such as a wired network (e.g., LAN, Ethernet connection, etc.) or a wireless network (e.g., Wi-Fi, 3G, 4G, Bluetooth, etc.). Thus, the invention provides systems which may include one or more of: a flat, screen material, a projector, a camera, a TV monitor, a computer monitor, a microphone; a speaker, audio cable, video cable, a mixing board, a computer device, a network, networking hardware, server devices and software, computer programs, display material or stands, signs, small hardware (brackets, mounting screws, etc.), or any combination thereof.

As used herein, the word "or" means "and or or", sometimes seen or referred to as "and/or", unless indicated otherwise.

INCORPORATION BY REFERENCE

References and citations to other documents, such as patents, patent applications, patent publications, journals, books, papers, web contents, have been made throughout this disclosure. All such documents are hereby incorporated herein by reference in their entirety for all purposes.

EQUIVALENTS

Various modifications of the invention and many further embodiments thereof, in addition to those shown and described herein, will become apparent to those skilled in the art from the full contents of this document, including references to the scientific and patent literature cited herein. The subject matter herein contains important information, exemplification and guidance that can be adapted to the practice of this invention in its various embodiments and equivalents thereof.

What is claimed is:

1. An audiovisual display system comprising:
    a flat screen comprising a translucent mesh defining an obverse surface and a reverse surface, wherein the mesh comprises synthetic fibers having a triangular cross-section and a maximum cross-sectional dimension of about 100 microns;
    an object disposed proximal to the reverse surface and visible through the screen to a person viewing the obverse surface;
    a projector configured to project an image onto the obverse surface;
    a speaker configured to transmit a sound wave towards the reverse surface; and
    a computer device comprising a tangible, non-transitory memory coupled to a processor, the computer device operably coupled to the speaker and the projector.

2. The audiovisual display system of claim 1, further comprising a microphone and further wherein the obverse surface faces the microphone.

3. The audiovisual display system of claim 1, wherein the synthetic fibers have a maximum cross-sectional dimension of about 20 microns.

4. The audiovisual display system of claim 1, wherein parallel ones of the synthetic fibers are spaced away from one another by a minimum spacing distance that is about 50 microns.

5. The audiovisual display system of claim 4, wherein the minimum spacing distance is about 100 microns.

6. The audiovisual display system of claim 5, wherein the minimum spacing distance is about 450 microns.

7. The audiovisual display system of claim 1, wherein some of the synthetic fibers are substantially perpendicular to others of the synthetic fibers.

8. The s audiovisual display system of claim 1, wherein the obverse surface comprises a gray color.

9. The audiovisual display system of claim 1, wherein the synthetic fibers are acrylic.

10. A method of presenting an audiovisual display, the method comprising:
- processing, with a computer comprising a memory coupled to a processor, a digital file to generate an audio signal defining a sound and an image signal defining an image;
- projecting, using a projector, the image onto an obverse surface of a flat screen comprising a translucent mesh defining the obverse surface and a reverse surface;
- i-lluminating an object with a light fixture, wherein the object is disposed such that the reverse surface faces the object, to make the object visible to a person looking at the obverse surface; and
- playing, using a speaker to transmit a sound wave towards the reverse surface, the sound.

11. The method of claim 10, wherein at least a part of the digital file is obtained through the use of a microphone while the microphone is disposed so that the obverse surface faces the microphone, the method further comprising diminishing the sound using the mesh to avoid a feedback loop between the microphone and the speaker.

12. The method of claim 10, wherein the mesh comprises synthetic fibers having a triangular cross-section.

13. The method of claim 12, wherein the synthetic fibers have a maximum cross-sectional dimension of about 100 microns.

\* \* \* \* \*